United States Patent
Oozeki et al.

(10) Patent No.: US 9,313,272 B2
(45) Date of Patent: Apr. 12, 2016

(54) INFORMATION PROCESSOR AND INFORMATION PROCESSING METHOD

(71) Applicant: HITACHI, LTD, Tokyo (JP)

(72) Inventors: Satoru Oozeki, Tokyo (JP); Yuusuke Nakata, Tokyo (JP); Shou Oobayashi, Tokyo (JP); Tomohisa Shibata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 384 days.

(21) Appl. No.: 13/782,259

(22) Filed: Mar. 1, 2013

(65) Prior Publication Data

US 2013/0325926 A1    Dec. 5, 2013

(30) Foreign Application Priority Data

May 30, 2012    (JP) .................................. 2012-123488

(51) Int. Cl.
*G06F 15/16* (2006.01)
*H04L 29/08* (2006.01)
*G06Q 10/06* (2012.01)

(52) U.S. Cl.
CPC ............ *H04L 67/1097* (2013.01); *G06Q 10/06* (2013.01)

(58) Field of Classification Search
CPC ..... G06Q 10/06; H04L 67/1097; H04L 67/00
See application file for complete search history.

(56) References Cited

U.S. PATENT DOCUMENTS

| 6,668,253 | B1 * | 12/2003 | Thompson et al. ................... 1/1 |
| 2011/0088101 | A1 * | 4/2011 | Shibata et al. ................... 726/29 |
| 2012/0054286 | A1 * | 3/2012 | Kieselbach ................... 709/206 |
| 2012/0054335 | A1 * | 3/2012 | Kieselbach ................... 709/224 |

FOREIGN PATENT DOCUMENTS

| EP | 2 254 291 A1 | 11/2010 |
| JP | 2011-257994 A | 12/2011 |
| JP | 2012-123488 A | 6/2012 |

OTHER PUBLICATIONS

Liu et al., CQ: A personalized update monitoring toolkit.*
(Continued)

*Primary Examiner* — Moustafa M Meky
*Assistant Examiner* — Thorne E Waugh
(74) *Attorney, Agent, or Firm* — Mattingly & Malur, PC

(57) ABSTRACT

An information processor receives a changed content check request on information managed by a user of a different system from a user terminal and a first condition is stored, the first condition being included in the check request and specifying a check target. A second condition specifying a changed content to be retrieved from among changed contents on the information managed by the user of the different system is received from the user terminal. An information-changed content check request is transmitted in which the stored first condition is specified to a converter that performs protocol conversion. A changed content check result is acquired from the converter and stored, the result being returned to the converter by the user terminal of the different system. The stored check result is checked against the second condition, and the check result that matches the second condition is returned to the user terminal.

6 Claims, 19 Drawing Sheets

(56) References Cited

OTHER PUBLICATIONS

European Search Report received in European Application No. 13157502 dated Jul. 13, 2013.

Ling Liu et al., "CQ: a personalized update monitoring toolkit", Proceedings of the 1998 ACM SIGMOD International Conference of Management of Data, SIGMOD '98, Jan. 1, 1998, pp. 547-549, New York, NY.

* cited by examiner

| MEMBER ID | CLIENT COMPANY ID | USER ID | PASSWORD | INTERSYSTEM COORDINATION BASE USE AUTHORITY |
|---|---|---|---|---|
| MEMBER1 | BUYER1 | USER1 | PASSWORD1 | OK |
| MEMBER2 | BUYER2 | USER2 | PASSWORD2 | OK |
| MEMBER3 | BUYER3 | USER3 | PASSWORD3 | OK |
| MEMBER4 | BUYER4 | USER4 | PASSWORD4 | NG |

FIG. 15

| SUPPLIER COMPANY ID |
|---|
| SUPPLIER1 |
| SUPPLIER2 |
| SUPPLIER3 |
| SUPPLIER4 |
| SUPPLIER5 |

FIG. 16

| SUPPLIER COMPANY ID | PRODUCT INFORMATION |
|---|---|
| SUPPLIER1 | PARTS11 PARTS12 |
| SUPPLIER2 | PARTS21 PARTS22 PARTS23 |
| SUPPLIER3 | PARTS31 PARTS32 PARTS33 |

FIG. 17

| CASE NO | CLIENT COMPANY ID | SUPPLIER COMPANY ID | PRODUCT INFORMATION | REQUEST STATUS |
|---|---|---|---|---|
| ANKEN1 | BUYER1 | SUPPLIER1 | PARTS11 | UNREQUESTED |
| ANKEN2 | BUYER1 | SUPPLIER1 | PARTS12 | REQUESTED |

| CASE NO | CLIENT COMPANY ID | SUPPLIER COMPANY ID | PRODUCT INFORMATION | PRODUCT VERSION | ATTACHED FILE | PROVISION STATUS |
|---|---|---|---|---|---|---|
| ANKEN2 | BUYER1 | SUPPLIER1 | PARTS12 | 1.0 | TENPU12.xml | UNPROVIDED |
| ANKEN3 | BUYER2 | SUPPLIER2 | PARTS21 | 1.0 | TENPU21.xml | PROVIDED |

| MEMBER ID | RETRIEVAL CONDITION 1 (PRODUCT INFORMATION) | RETRIEVAL CONDITION 2 (PRODUCT VERSION) |
|---|---|---|
| MEMBER1 | PARTS21 | 2.0 OR LATER |
| MEMBER1 | PARTS22 | |

| MEMBER ID | CHECK CONDITION 1 (CLIENT COMPANY ID) | CHECK CONDITION 2 (SUPPLIER COMPANY ID) | CHECK CONDITION 3 (PRODUCT INFORMATION) |
|---|---|---|---|
| MEMBER1 | BUYER1 | | |
| MEMBER2 | BUYER2 | SUPPLIER1 | |
| MEMBER3 | BUYER3 | SUPPLIER2 | PARTS21 |

FIG. 21

| CASE NO | CLIENT COMPANY ID | SUPPLIER COMPANY ID | PRODUCT INFORMATION | CHANGE CHECK REQUEST STATUS |
|---|---|---|---|---|
| ANKEN1 | BUYER1 | SUPPLIER1 | PARTS11 | UNCHECKED |
| ANKEN2 | BUYER1 | SUPPLIER1 | PARTS12 | CHECKED |

FIG. 22

| CASE NO | CLIENT COMPANY ID | SUPPLIER COMPANY ID | PRODUCT INFORMATION | PRODUCT VERSION | ATTACHED FILE | CHANGED CONTENT PROVISION STATUS |
|---|---|---|---|---|---|---|
| ANKEN2 | BUYER1 | SUPPLIER1 | PARTS12 | 1.0 | TENPU12.xml | UNPROVIDED |
| ANKEN3 | BUYER2 | SUPPLIER2 | PARTS21 | 1.0 | TENPU21.xml | PROVIDED |
| ANKEN4 | BUYER3 | SUPPLIER3 | PARTS22 | 1.0 | | PROVIDED |

FIG. 23

| MEMBER ID | CHECK CONDITION 1 (CLIENT COMPANY ID) | CHECK CONDITION 2 (SUPPLIER COMPANY ID) | CHECK CONDITION 3 (PRODUCT INFORMATION) |
|---|---|---|---|
| MEMBER1 | BUYER1 | | |
| MEMBER2 | BUYER2 | SUPPLIER1 | |
| MEMBER3 | BUYER3 | SUPPLIER2 | PARTS21 |

FIG. 27

| MEMBER ID | RETRIEVAL CONDITION 1 (PRODUCT INFORMATION) | RETRIEVAL CONDITION 2 (PRODUCT VERSION) |
|---|---|---|
| MEMBER3 | PARTS21 | 2.0 OR LATER |

FIG. 28

| CLIENT COMPANY ID | SUPPLIER COMPANY ID | PRODUCT NUMBER | PRODUCT VERSION | ATTACHED FILE INFORMATION |
|---|---|---|---|---|
| BUYER2 | SUPPLIER2 | PARTS21 | 2.0 | TENPU21.xml |

FIG. 29

INFORMATION PROCESSOR AND INFORMATION PROCESSING METHOD

CROSS-REFERENCE TO RELATED APPLICATIONS

The present application claims the benefit of priority to Japanese Patent Application No. 2012-123488, filed May 30, 2012, of which full contents are incorporated herein by reference.

BACKGROUND OF THE INVENTION

1. Field of the Invention

The present invention relates to an information processor, an information processing method, and a program. Specifically, the present invention relates to a technique for lightening the workloads, efforts and the like of users in check of information change between different systems by providing an information requesting user with a notification of an information change of an information change check target, in a manner meeting the needs of the information requesting user.

2. Related Art

There is an inter-company information exchange and sharing system that implements a mechanism of EDI (Electronic Data Interchange) and so-called inter-company transaction processing in a secure network infrastructure. The EDI enables companies to make placement and acceptance of orders, settlement and the like of various parts and services therebetween through electronic processing, and the inter-company transaction processing is implemented for delivery and receipt of estimates, exchange of other various kinds of information and the like. If there is any change in various attributes such for example as specifications and model numbers of parts they use and environmental load information, member companies of such an inter-company information exchange and sharing system acquire information on such changes by requesting the information from their business partners who supply those parts, since such changes affect their operations, products and the like using those parts. As a general conventional technique for detecting such changes in information elsewhere, there has been proposed a technique to detect an update of an external API part included in a node other than a node to be monitored in a distributed application system (Japanese Patent Application Laid-open Publication No. 2011-257994), for example.

SUMMARY OF THE INVENTION

The aforementioned inter-company information exchange and sharing system can also be coupled to another system through a predetermined protocol conversion server or the like, and thus can exchange data indirectly with other user terminals belonging to the other system, besides user terminals of its own member company. In such a configuration, for example, in order to allow the users of its own and the other user terminals in the other system to exchange changed information therebetween, the inter-company information exchange and sharing system, the protocol conversion servers and the like perform transmission, reception and conversion of data following predetermined procedures, thereby exchanging the changed information.

In a case where the frequency of information updates is high at a target for check of information change (hereinafter, called an information change check target) or where there are many information change check targets (e.g., parts, products and the like), the exchange of the changed information through the procedures as described above forces the member companies as the users and the other system users of partners for exchange of various kinds of information concerned to perform very complicated operations of requesting and responding to the changed information. As a result, efforts and costs associated therewith are also increased.

Meanwhile, in the case of employing a technique to provide an update notification as in the conventional technique, notifications of changed information are automatically transferred between the member companies and the other system users according to the operations of the inter-company information exchange and sharing system, the protocol conversion server and the like. If there are many information change check targets or if the frequency of information updates is high, the receiver side of the notifications of the changed information receives an enormous number of notifications, and is required to do very complicated works for checking the contents of the notifications, determining the necessity of each notification, and checking differences between notifications for the same check target, resulting in an increase in burden.

Therefore, it is an object of the present invention to provide a technique for lightening the workloads, efforts and the like of users in check of information change between different systems by providing an information requesting user with a notification of an information change of an information change check target, in a manner meeting the needs of the information requesting user.

An information processor of the present invention to achieve the aforementioned object includes: a communication device configured to communicate with another device through a network; a storage device configured to store data; and a computing device configured to execute: receiving a changed content check request on information managed by a user of a different system from a user terminal and storing a first condition in the storage device, the first condition being included in the check request and specifying a check target; receiving a second condition from the user terminal, the second condition specifying a changed content to be retrieved from among changed contents on the information managed by the user of the different system, and storing the second condition in the storage device; transmitting an information-changed content check request in which the first condition stored in the storage device is specified to a converter configured to perform protocol conversion between the information processor and the different system; acquiring a changed content check result from the converter, and storing the acquired result in the storage device, the result being returned to the converter by the user terminal of the different system which has accessed the converter and performed changed content check for the relevant information in response to the check request; and checking the check result stored in the storage device against the second condition, and returning the check result that matches the second condition to the user terminal.

An information processing method of the present invention for an information processor including a communication device configured to communicate with another device through a network and a storage device configured to store data includes: receiving a changed content check request on information managed by a user of a different system from a user terminal and storing a first condition in the storage device, the first condition being included in the check request and specifying a check target; receiving a second condition from the user terminal, the second condition specifying a changed content to be retrieved from among changed contents on the information managed by the user of the different system, and storing the second condition in the storage device; transmitting an information-changed content check request in which the first condition stored in the storage device is specified to a converter configured to perform protocol conversion between the information processor and the different system; acquiring a changed content check result from the converter, and storing the acquired result in the storage device, the result being returned to the converter by the user terminal of the different system which has accessed the converter and performed changed content check for the relevant information in response to the check request; and checking the check result stored in the storage device against the second condition, and returning the check result that matches the second condition to the user terminal.

A program of the present invention allows an information processor including a communication device configured to communicate with another device through a network and a storage device configured to store data to execute: receiving a changed content check request on information managed by a user of a different system from a user terminal and storing a first condition in the storage device, the first condition being included in the check request and specifying a check target; receiving a second condition from the user terminal, the second condition specifying a changed content to be retrieved from among changed contents on the information managed by the user of the different system, and storing the second condition in the storage device; transmitting an information-changed content check request in which the first condition stored in the storage device is specified to a converter configured to perform protocol conversion between the information processor and the different system; acquiring a changed content check result from the converter, and storing the acquired result in the storage device, the result being returned to the converter by the user terminal of the different system which has accessed the converter and performed changed content check for the relevant information in response to the check request; and checking the check result stored in the storage device against the second condition, and returning the check result that matches the second condition to the user terminal.

According to the present invention, check of information change between different systems is performed by providing an information requesting user with a notification of an information change of an information change check target, in a manner meeting the needs of the information requesting user, thereby lightening the workloads, efforts and the like of users.

BRIEF DESCRIPTION OF THE DRAWINGS

FIG. 15 is a diagram showing a data configuration example of a client company information DB according to the present embodiment;

FIG. 16 is a diagram showing a data configuration example of a supplier company information DB according to the present embodiment;

FIG. 17 is a diagram showing a data configuration example of a product information DB according to the present embodiment;

FIG. 18 is a diagram showing a data configuration example of a request message management DB according to the present embodiment;

FIG. 19 is a diagram showing a data configuration example of a provision message management DB according to the present embodiment;

FIG. 20 is a diagram showing a data configuration example of a changed content retrieval condition DB according to the present embodiment;

FIG. 21 is a diagram showing a data configuration example of a change check request condition DB according to the present embodiment;

FIG. 22 is a diagram showing a data configuration example of a change check request message management DB according to the present embodiment;

FIG. 23 is a diagram showing a data configuration example of a changed content provision message management DB according to the present embodiment;

FIG. 27 is a diagram showing a data configuration example of a change check request condition message according to the present embodiment;

FIG. 28 is a diagram showing a data configuration example of a changed content retrieval condition message according to the present embodiment; and FIG. 29 is a diagram showing a data configuration example of a changed content provision message according to the present embodiment.

DESCRIPTION OF THE PREFERRED EMBODIMENTS

System Configuration

Figure 1:
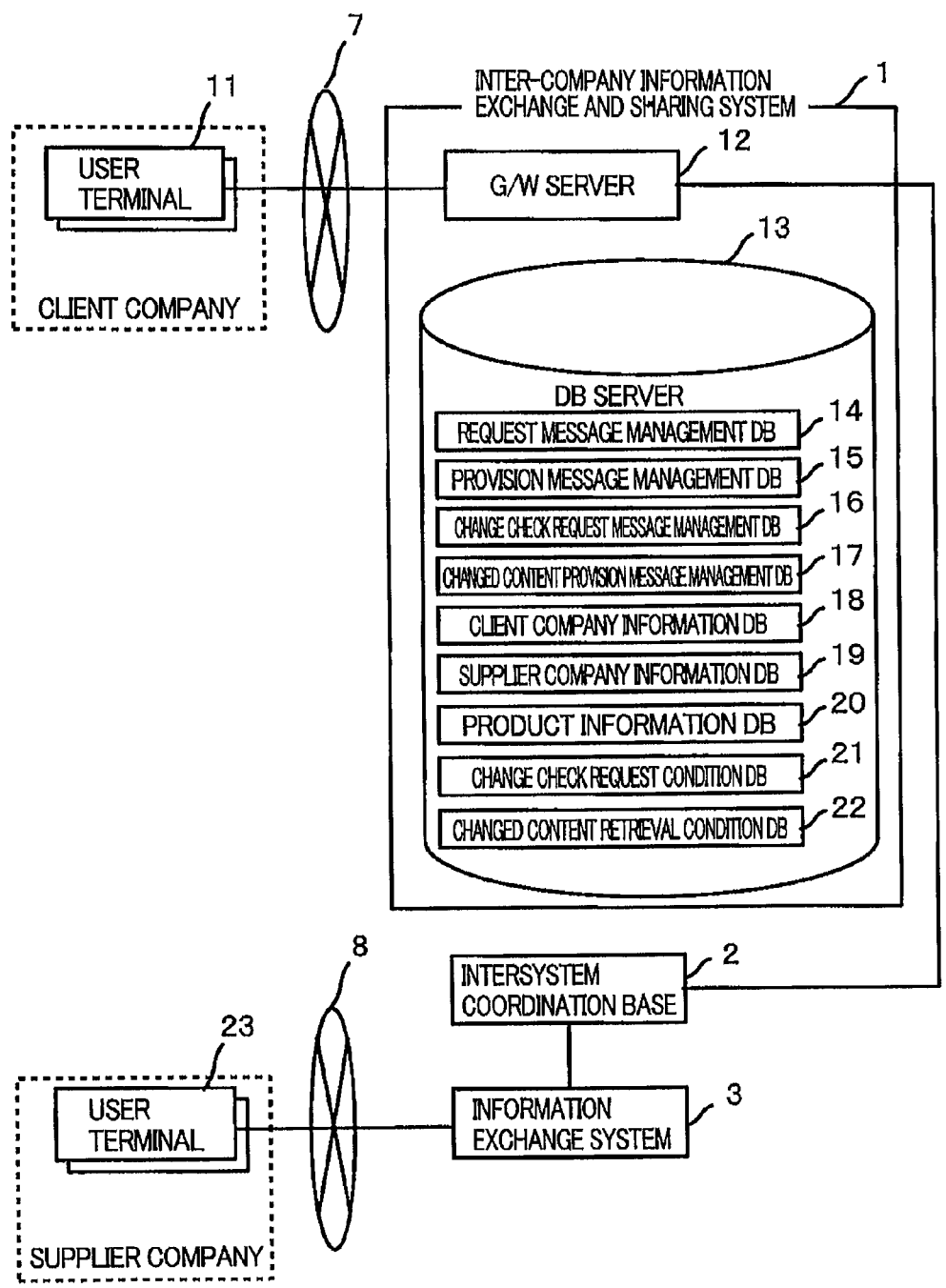
FIG. 1 is a network configuration diagram including an inter-company information exchange and sharing system according to the present embodiment.

Hereinafter, detailed descriptions will be given of an embodiment of the present invention by use of the accompanying drawings. FIG. 1 is a network configuration diagram including an inter-company information exchange and sharing system 1 that is an information processor of the present embodiment. The inter-company information exchange and sharing system 1 shown in FIG. 1 is a computer system capable of lightening the workload, effort and the like of each user by allowing notification of a change in information related to an information change check target between different systems to meet the needs of an information requesting user. The inter-company information exchange and sharing system 1 described as an example in the present embodiment is a server apparatus configured to intermediate between a product supplier and a buyer for inter-company transactions, which can exchange data with (a user terminal 23 of) an information exchange system 3 that is another system through a converter (an intersystem coordination base 2 and the information exchange system 3 to be described later).

Here, it is assumed that information managed by a user company of the information exchange system 3 that is another inter-company transaction system different from the inter-company information exchange and sharing system is the aforementioned "information change check target". This information on the "information change check target" is various kinds of information (e.g., specifications, model numbers, environmental load information and the like) on parts supplied to other companies by the user company. Here, the description is provided based on the assumption that a user terminal 11 of the inter-company information exchange and sharing system 1 acquires changed contents in information managed by the user terminal 23 belonging to the information exchange system 3.

The client user terminal 11 is coupled to the inter-company information exchange and sharing system 1 illustrated in FIG. 1 through a network 7. In addition, the intersystem coordination base 2, the information exchange system 3 and the supplier user terminal 23 are coupled to the inter-company information exchange and sharing system 1 through a network 8.

The client user terminal 11 is a terminal used by a user company (hereinafter referred to as a user company A) that is a member of the inter-company information exchange and sharing system 1. The user company A that is a user of the client user terminal 11 receives supply of parts from a user company (hereinafter referred to as a user company B) of the information exchange system 3. Therefore, if changes are made to the specifications, model numbers, environmental load information and the like about the parts supplied by the user company B, the user company A needs to check the changed contents of such information. The user company A sends a check request for the changed contents of the information on the parts to the inter-company information exchange and sharing system 1 through the client user terminal 11.

Meanwhile, the supplier user terminal 23 is a terminal used by the user company B that is a member of the information exchange system 3 described above. The user company B that is a user of the supplier user terminal 23 supplies parts to the user company A described above. The user company B uses its own storage device and the like to change the specifications, model numbers, environmental load information and the like as needed about the parts supplied to the user company A. The user company B uses the supplier user terminal 23 to reply to the inter-company information exchange and sharing system 1 through the information exchange system 3 and the intersystem coordination base 2 about the changed contents of the information on the parts in response to the changed content check request from the client user terminal 11 described above.

In addition, the intersystem coordination base 2 is a base provided between different inter-company information exchange and sharing systems, i.e., the inter-company information exchange and sharing system 1 and the information exchange system 3, and having a function of intermediate processing for an "information exchange" request from a user company of each system. Specific examples of the intersystem coordination base 2 include a system serving as a base for exchanging information on chemicals (e.g., JAMP-GP: http://www.biz.jemai.or.jp/JAMP-GP/about/) and the like.

On the other hand, the inter-company information exchange and sharing system 1 of the present embodiment includes a G/W server 12 and a DB server 13. The DB server 13 stores the following databases in a storage device: a request message management DB 14, a provision message management DB 15, a change check request message management DB 16, a changed content provision message management DB 17, a client company information DB 18, a supplier company information DB 19, a product information DB 20, a change check request condition DB 21 and a changed content retrieval condition DB 22. Meanwhile, the G/W server 12 serves as a server apparatus to execute required processes for the information processor of the present embodiment using the respective databases in the DB server 13.

Figure 2:
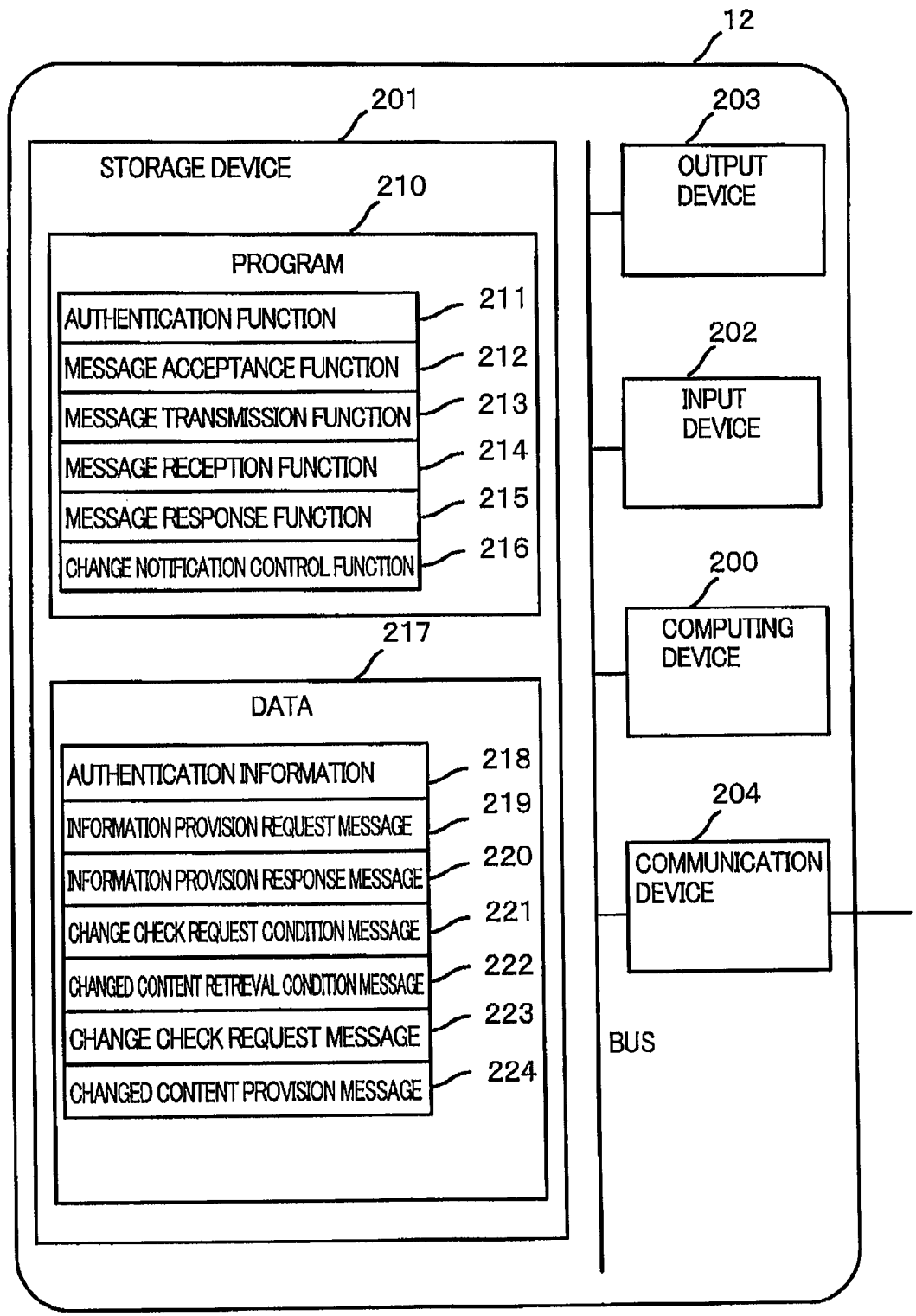
FIG. 2 is a diagram showing a hardware configuration example of the inter-company information exchange and sharing system according to the present embodiment.

FIG. 2 shows a hardware configuration example of the G/W server. The G/W server 12 includes: a storage device 201 formed using an appropriate nonvolatile storage device such as a hard disk drive; a computing device 200 such as a CPU to perform integrated control of the server apparatus itself by reading and executing a program 210 stored in the storage device 201 and also to perform various determination, calculation and control processing; an input device 202 configured to receive a key input or a voice input from a user; an output device 203 such as a display to display processed data; and a communication device 204 coupled to a network and configured to perform communication with other devices such as the client user terminal 11 and the intersystem coordination base 2. Note that the respective devices 200 to 204 are coupled to each other through a bus.

The aforementioned program 210 is a program for implementing an authentication function 211, a message acceptance function 212, a message transmission function 213, a message reception function 214, a message response function 215 and a change notification control function 216.

Also, the storage device 201 stores data 217 sent from the client user terminal 11 or the supplier user terminal 23, such as authentication information 218, an information provision request message 219, an information provision response message 220, a change check request condition message 221, a changed content retrieval condition message 222, a change check request message 223 and a changed content provision message 224.

Next, a description will be given of functions included in the inter-company information exchange and sharing system 1 of the present embodiment. As described above, it can be said that the functions described below are those implemented by executing the program 210 in the G/W server 12 included in the inter-company information exchange and sharing system 1, for example.

The inter-company information exchange and sharing system 1 includes a function to receive a changed content check request on information managed by the user company B of the information exchange system 3 from the client user terminal 11 of the user company A and to store, in the storage device 201, a change check request condition (a first condition) that specifies a check target, the condition being included in the check request. This function is included in the message acceptance function 212 shown in FIG. 2.

In addition, the inter-company information exchange and sharing system 1 includes a function to receive, from the client user terminal 11 of the user company A, a changed content retrieval condition (a second condition) that specifies a changed content to be retrieved among changed contents on the information managed by the user company B of the information exchange system 3, and to store the received condition in the storage device 201. This function is included in the message acceptance function 212 shown in FIG. 2.

Moreover, the inter-company information exchange and sharing system 1 includes a function to transmit an information-changed content check request in which the change check request condition stored in the storage device 201 is specified to the aforementioned intersystem coordination base 2 that is a converter configured to perform protocol conversion between the inter-company information exchange and sharing system 1 and the information exchange system 3. This function is included in the change notification control function 216.

Furthermore, the inter-company information exchange and sharing system 1 includes a function to acquire a changed content check result from the intersystem coordination base 2 and to store the acquired result in the storage device 201. Here, the result is returned to the intersystem coordination base 2 through the information exchange system 3 by the supplier user terminal 23 described above. In this case, before that, the supplier user terminal 23 accesses the intersystem coordination base 2 through the information exchange system 3 and performs changed content check for the relevant information in response to a check request from the client user terminal 11. This function is included in the message reception function 214.

The inter-company information exchange and sharing system 1 includes a function to check the check result stored in the storage device 201 against a changed content retrieval condition, and return the check result that matches the changed content retrieval condition to the client user terminal 11. This function is included in the change notification control function 216.

Note that it is preferable that the inter-company information exchange and sharing system 1 include a function to acquire, as the change check request condition or the changed content retrieval condition, at least any of identification information on the user company B of the information exchange system 3 and identification information on a product handled by the user company B of the information exchange system 3 or a combination thereof, and to store the acquired information in the storage device 201.

In addition, it is preferable that the inter-company information exchange and sharing system 1 include a function to acquire, as the change check request condition or the changed content retrieval condition, specification information on a product handled by the user company B of the information exchange system 3, and to store the acquired information in the storage device 201.

Moreover, it is preferable that the inter-company information exchange and sharing system 1 include a function to acquire, as the change check request condition or the changed content retrieval condition, a combination of identification information on the user company B of the information exchange system 3 and identification information on the user company A of the client user terminal 11 of a sender of the check request or the changed content retrieval condition, and to store the acquired information in the storage device 201.

Procedure Example 1

Hereinafter, a description will be given of an actual procedure of an information processing method of the present embodiment with reference to the drawing. Various operations corresponding to the information processing method described below are realized by the program 210 executed by the G/W server 12 included in the inter-company information exchange and sharing system 1. The program 210 includes codes for executing the various operations described below.

Figure 3:
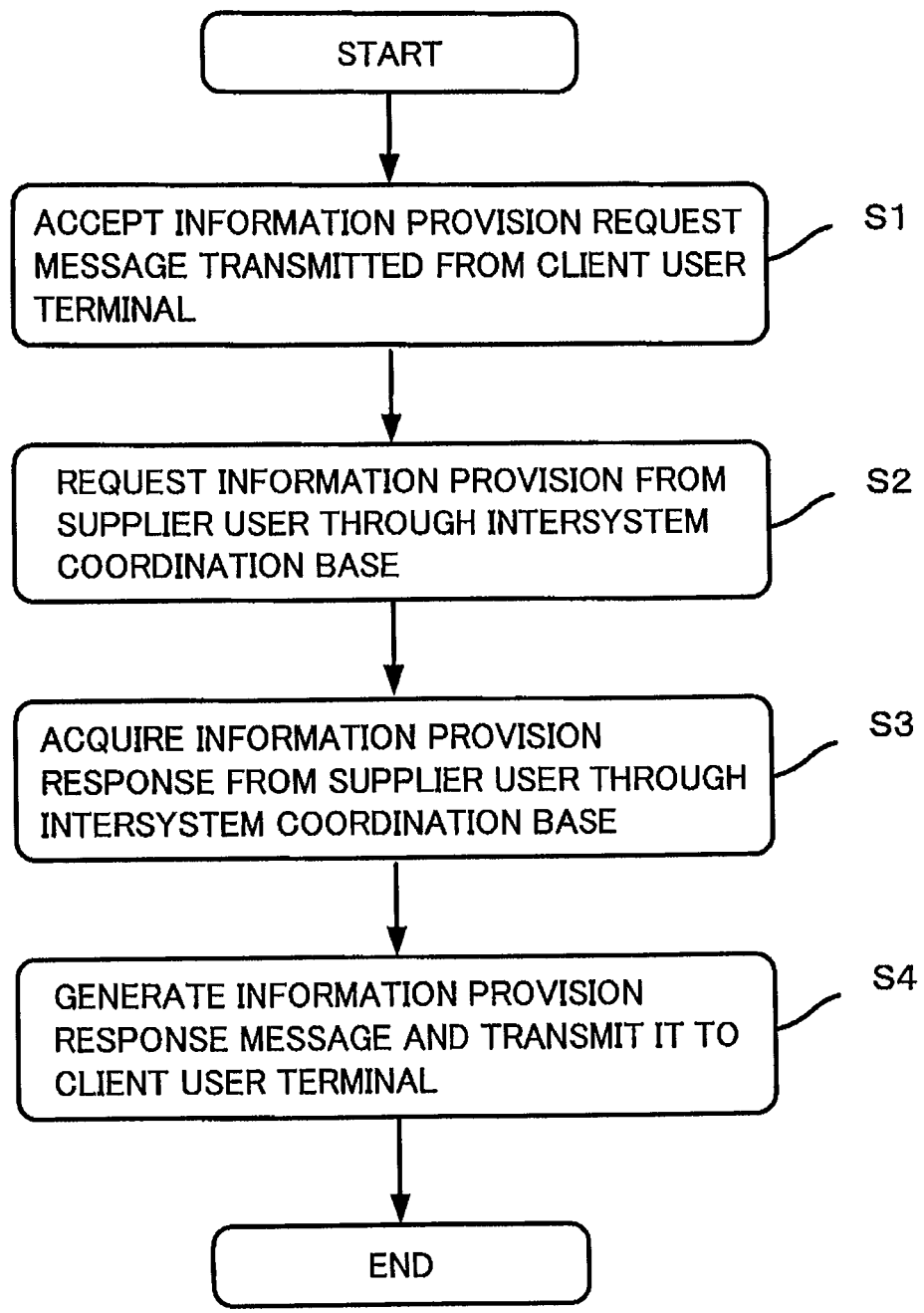
FIG. 3 is a flowchart showing procedure example 1 of an information processing method according to the present embodiment.

FIG. 3 is a flowchart showing procedure example 1 of the information processing method according to the present embodiment. Here, a description will be given first of an operation of the inter-company information exchange and sharing system 1 when the client user terminal 11 requests the inter-company information exchange and sharing system 1 to provide information on predetermined parts which are being provided by the user company B, in a state where no change is made to information on the parts managed by the user company B.

Figure 25:
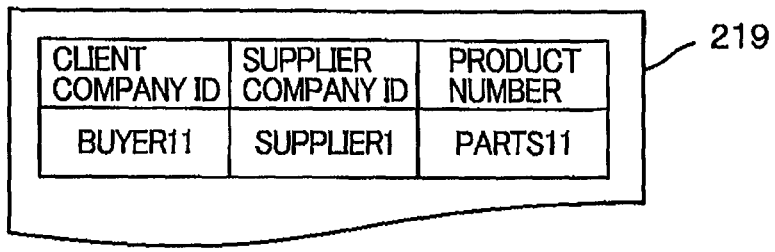
FIG. 25 is a diagram showing a data configuration example of an information provision request message according to the present embodiment.

In this case, the G/W server 12 of the inter-company information exchange and sharing system 1 accepts the information provision request message 210 sent from the client user terminal 11 through the network 7, and stores the message in the storage device 201 (S1). As a specific example of the information provision request message 219, a telegram message is assumable, which includes values such as a client company ID that is identification information on the aforementioned user company A, a supplier company ID that is identification information on the user company B and a product number that is identification information on a target product, of which information is desired by the user company A, as shown in FIG. 25.

Figure 26:
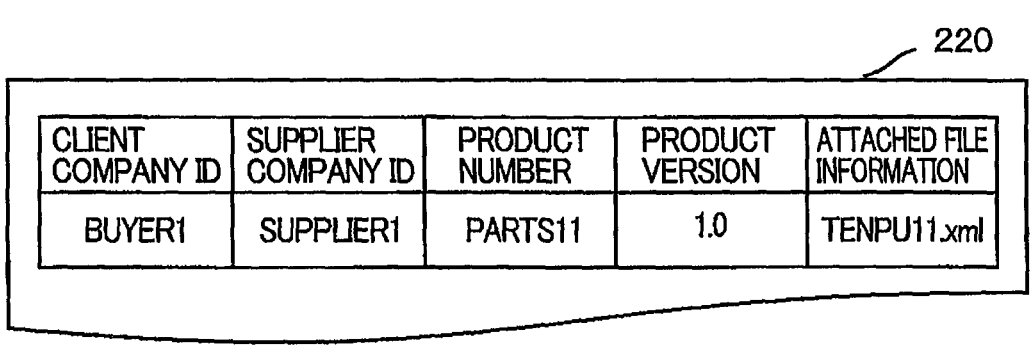
FIG. 26 is a diagram showing a data configuration example of an information provision response message according to the present embodiment.

Upon receipt of the information provision request message 219 from the client user terminal 11, the G/W server 12 requests the supplier user terminal 23 of the user company B, through the intersystem coordination base 2 and the information exchange system 3, to provide information on the parts (S2). Thereafter, the G/W server 12 acquires an information provision response from the supplier user terminal 23 through the intersystem coordination base 2 (S3). The G/W server 12 generates the information provision response message 220 and transmits the message to the client user terminal 11 (S4). As a specific example of the information provision response message 220, a telegram message is assumable, which includes values such as the client company ID that is the identification information on the aforementioned user company A, the supplier company ID that is the identification information on the user company B, the product number and a product version that are the identification information on the target product, of which information is desired by the user company A, and attached file information, as shown in FIG. 26.

Procedure Example 2

Figure 4:
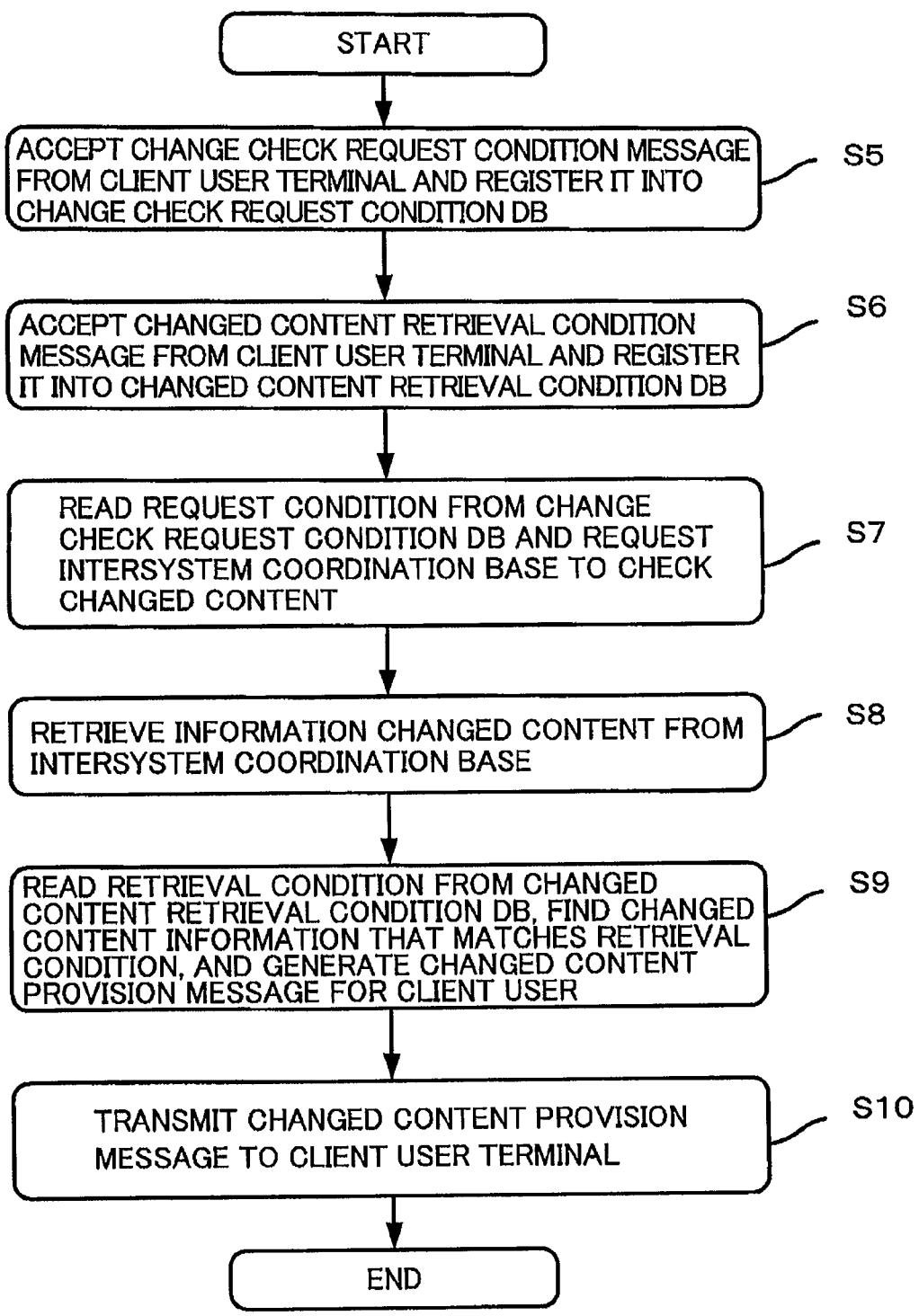
FIG. 4 is a flowchart showing procedure example 2 of the information processing method according to the present embodiment.

Next, with reference to the drawing, a description will be given of a series of processing of accepting the change check request condition message 221 and the changed content retrieval condition message 222 from the client user terminal 11 and then transmitting information in accordance with these messages to the client user terminal 11. FIG. 4 is a flowchart showing procedure example 2 of the information processing method according to the present embodiment In this case, the G/W server 12 accepts the change check request condition message 221 from the client user terminal 11, the message describing the change check request condition specifying an information change check target, and then registers the message in the change check request condition DB 21 (S5). As a specific example of the change check request condition message 221, a telegram message is assumable, which includes values such as a member ID that is identification information on the aforementioned user company A and check conditions 1 to 3, as shown in FIG. 27. In this example, a combination of the member ID that is the identification information on the user company A and check conditions 1 to 3 serves as the change check request condition.

In addition, the G/W server 12 accepts the changed content retrieval condition message 222 from the client user terminal 11, the message specifying a changed content to be retrieved among changed contents on the information managed by the aforementioned user company B, and then registers the message in the changed content retrieval condition DB 22 (S6). As a specific example of the changed content retrieval condition message 222, a telegram message is assumable, which includes values such as the member ID that is the identification information on the aforementioned user company A and retrieval conditions 1 and 2, as shown in FIG. 28. In this example, a combination of the member ID that is the identification information on the user company A and the retrieval conditions 1 and 2 serves as the changed content retrieval condition.

Subsequently, the G/W server 12 reads the change check request condition in the change check request condition DB 21, and sends a changed content check request corresponding to the change check request condition to the intersystem coordination base 2 (S7). Then, the G/W server 12 acquires information that matches the change check request condition, i.e., changed contents on the information of the check target uploaded into the intersystem coordination base 2 from the supplier user terminal 23 of the user company B, from the intersystem coordination base 2 which has executed necessary processing in response to the changed content check request (S8).

Thereafter, the G/W server 12 reads the retrieval condition in the changed content retrieval condition DB 22, finds changed content information (acquired in Step S8) that matches the retrieval condition, and then generates the changed content provision message 224 including the found changed content information for the client user terminal 11 (S9). Subsequently, the G/W server 12 transmits the changed content provision message 224 to the client user terminal 11 (S10) and then ends the processing.

Procedure Example 3

Figure 5:
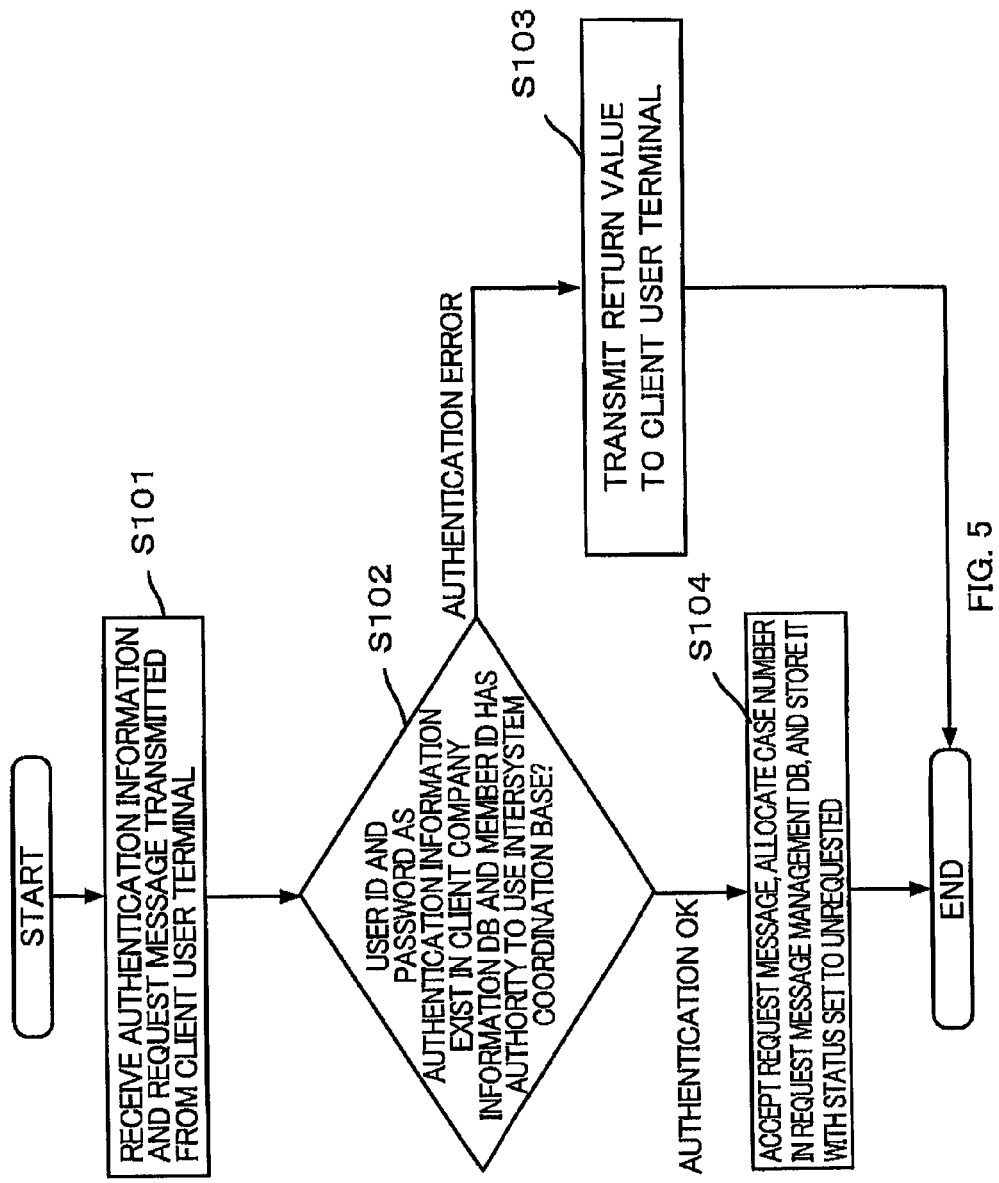
FIG. 5 is a flowchart showing procedure example 3 of the information processing method according to the present embodiment.

Next, with reference to the drawing, a description will be given of processing in Step S1 in the aforementioned Procedure Example 1. FIG. 5 is a flowchart showing procedure example 3 of the information processing method according to the present embodiment, more specifically, a flowchart showing a procedure for the G/W server 12 to accept the information provision request message 219 sent from the client user terminal 11.

Figure 24:
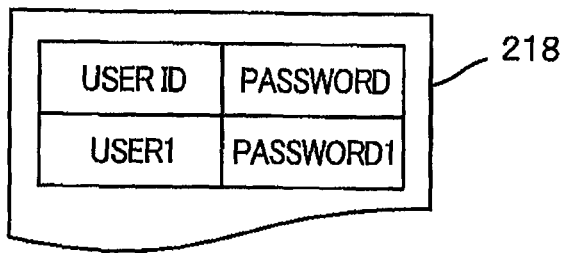
FIG. 24 is a diagram showing a data configuration example of authentication information according to the present embodiment.

In this case, the G/W server 12 receives the authentication information 218 and the information provision request message 219, which are transmitted from the client user terminal 11 (S101). As a specific example of the authentication information 218, a telegram message is assumable, which includes values such as a user ID that is identification information on the aforementioned user company A as the user of the client user terminal 11, and a password paired with the user ID, as shown in FIG. 24. As a specific example of the information provision request message 219, a telegram message is assumable, which includes values such as the client company ID that is the identification information on the aforementioned user company A, the supplier company ID that is the identification information on the user company B and the product number that is the identification information on the target product, of which information is desired by the user company A.

Subsequently, the authentication function 211 of the G/W server 12 checks the user ID and password as the authentication information 218 against the client company information DB 18 to confirm that the set of the user ID and the password exists in the record of the client company information DB 18 (S102). As a specific example of the client company information DB 18, a record aggregate is assumable, which includes values such as the member ID, client company ID and user ID which are the identification information on the user company, a password set for the user company and the intersystem coordination base use authority indicating whether or not the user company has the authority to use the intersystem coordination base 2, as shown in FIG. 15. Moreover, in Step S102, the authentication function 211 of the G/W server 12 checks the value of the intersystem coordination base use authority in the record of the client company information DB 18 to see if the user company corresponding to the user ID has the authority to use the intersystem coordination base 2.

When the received user ID and password do not exist in the client company information DB 18 or when the user company corresponding to the user ID does not have the authority to use the intersystem coordination base 2 (S102; authentication error), the authentication function 211 of the G/W server 12 transmits a predetermined return value indicating unsuccessful authentication to the client user terminal 11, and then ends the processing (S103). On the other hand, when the received user ID and password exist in the client company information DB 18 and the user company corresponding to the user ID has the authority to use the intersystem coordination base 2 (S102; authentication OK), the message acceptance function 212 of the G/W server 12 accepts the information provision request message 219 from the aforementioned client user terminal 11, allocates a case number to the information provision request message 219 according to predetermined rules, and stores it in the request message management DB 14 (S104). As a specific example of the information provision request message 219, a telegram message is assumable, which includes values such as the client company ID that is identification information on the aforementioned user company A, the supplier company ID that is the identification information on the user company B and the product number that is the identification information on the target product, of which information is desired by the user company A, as shown in FIG. 25. In addition, as a specific example of the request message management DB 14, a record aggregate is assumable, which includes values such as the client company ID that is the identification information on the user company A that desires information provision using the case number thus allocated as a key, the supplier company ID that is the identification information on the user company B requested to provide information, the product information that is the identification information on the target product of which information is desired by the user company A, and request information indicating whether or not an information provision request is made to the user company B, as shown in FIG. 18. Note that in storing the information provision request message 219 in the request message management DB 14 in Step S104 described above, "unrequested" is set as the value of "request status".

Procedure Example 4

Figure 6:
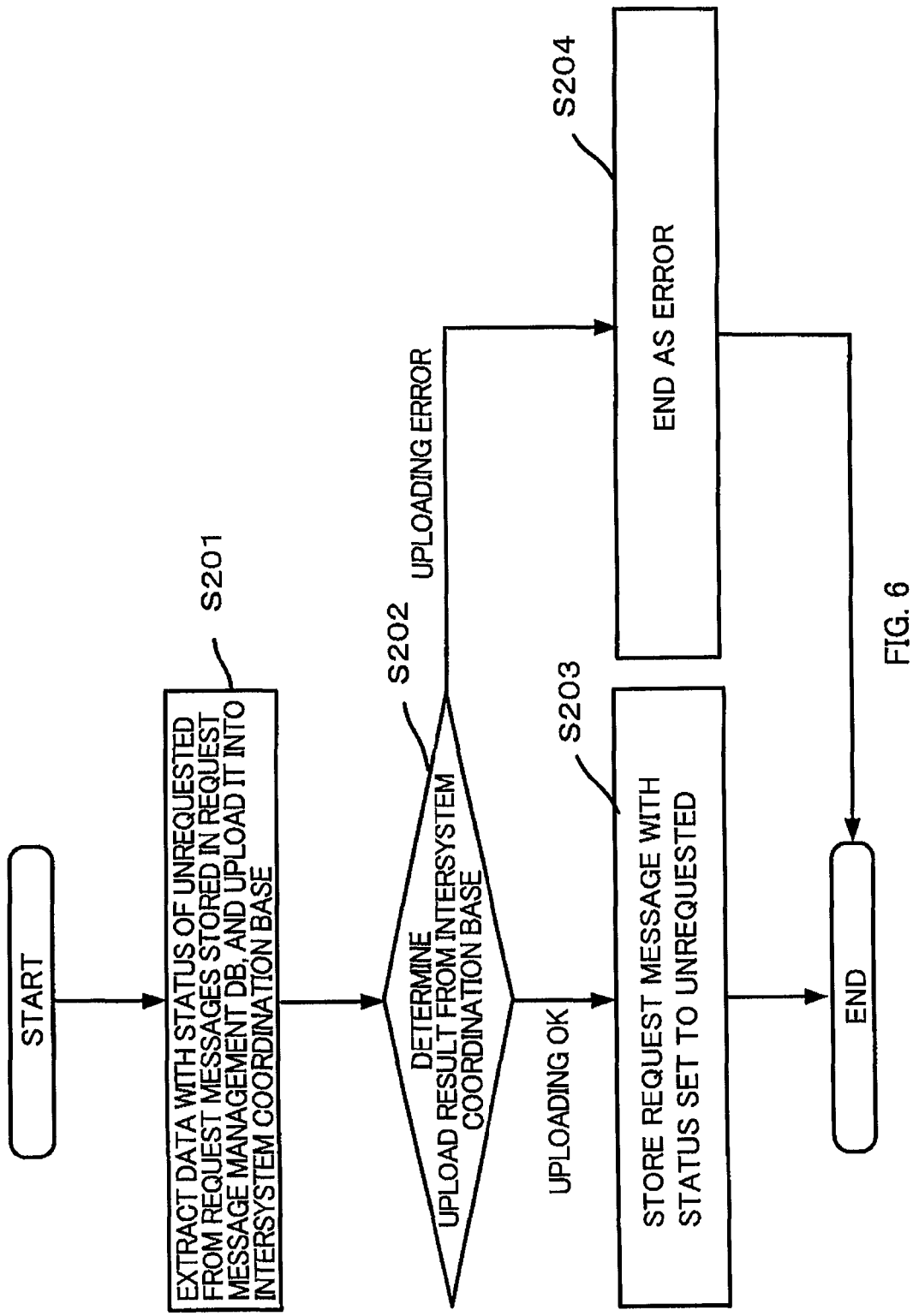
FIG. 6 is a flowchart showing procedure example 4 of the information processing method according to the present embodiment.

Next, with reference to the drawing, a description will be given of processing in Step S2 in the aforementioned Procedure Example 1. FIG. 6 is a flowchart showing procedure example 4 of the information processing method according to the present embodiment, more specifically, a flowchart showing a procedure for the G/W server 12, upon receipt of the information provision request message 219 from the client user terminal 11, to request the supplier user terminal 23 of the user company B to provide information on the parts, through the intersystem coordination base 2 and the information exchange system 3.

In this case, the G/W server 12 extracts data of "unrequested" as the value of "request status" from the information provision request message 219 stored in the request message management DB 14, and then uploads the data into the intersystem coordination base 2 (S201). Following Step S201, the G/W server 12 receives an upload result from the intersystem coordination base 2 and determines the result (S202). If the upload result is "OK" (S202: upload OK), the message transmission function 213 of the G/W server 12 updates the value of "request status" of the information provision request message in the request message management DB 14 to "requested" (S203), and then ends the processing. On the other hand, if the upload result is "error" (S202: upload error), the message transmission function 213 of the G/W server 12 ends the processing as an error (S204).

Procedure Example 5

Figure 7:
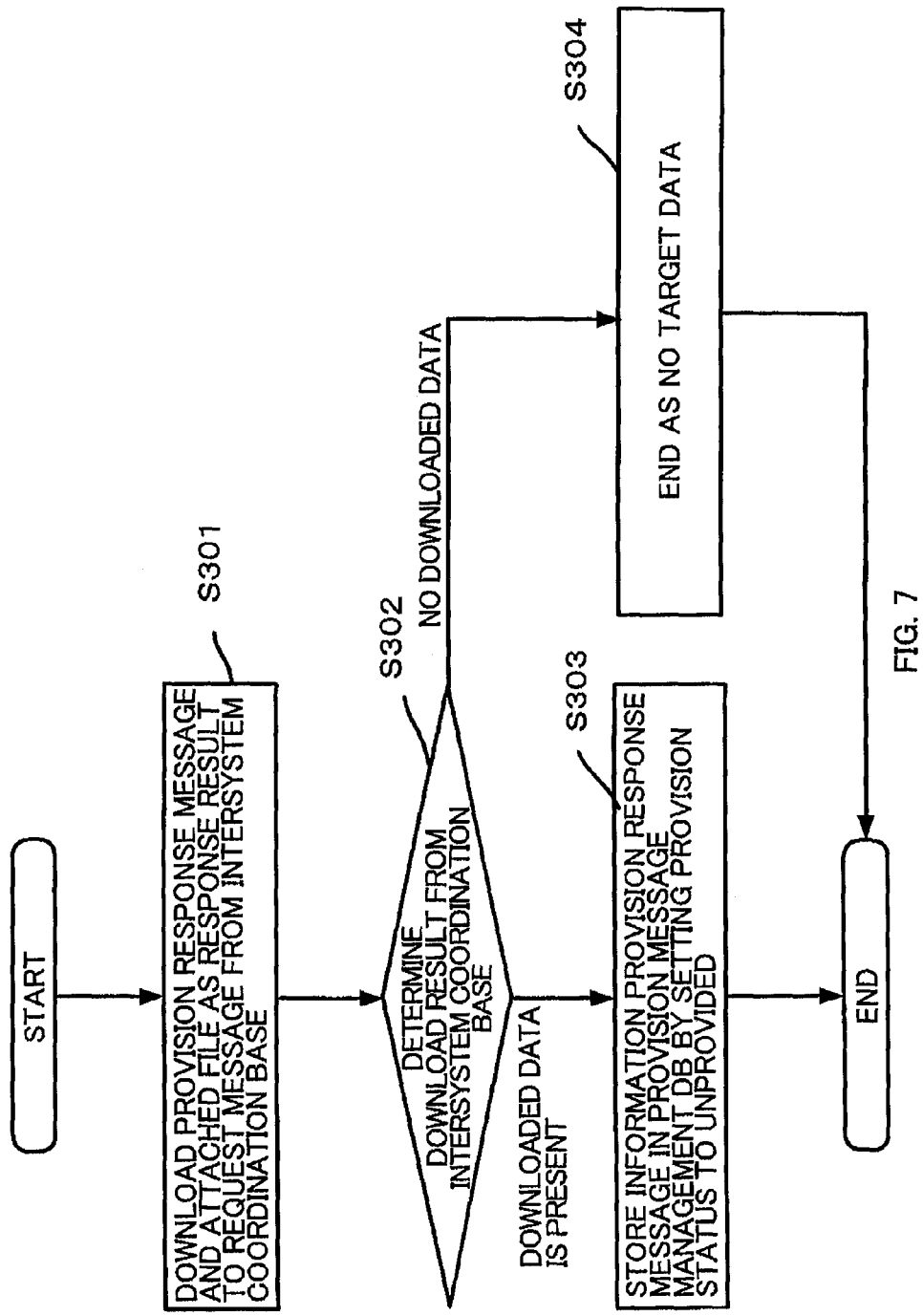
FIG. 7 is a flowchart showing procedure example 5 of the information processing method according to the present embodiment.

Next, with reference to the drawing, a description will be given of Step S3 in the aforementioned Procedure Example 1. FIG. 7 is a flowchart showing procedure example 5 of the information processing method according to the present embodiment, more specifically, a flowchart showing a procedure for the G/W server 12 to acquire an information provision response from the supplier user terminal 23 through the intersystem coordination base 2.

In this case, the G/W server 12 downloads the information provision response message 220 and an attached file from the intersystem coordination base 2 as a result of a response from the supplier user terminal 23 to the information provision request message 219 uploaded into the intersystem coordination base 2 as described above (S301). As a specific example of the information provision response message 220, a telegram message is assumable, which includes values such as the client company ID that is the identification information on the aforementioned user company A that desires information provision, the supplier company ID that is the identification information on the user company B as a provider providing information in response to the request, the product number and product version that are the identification information on the target product, of which information is desired by the user company A, and the attached file information, as shown in FIG. 26.

Thereafter, the G/W server 12 determines a result of the downloading from the intersystem coordination base 2 in Step S301 (S302). If there is downloaded data (S302: downloaded data is present), the message reception function 214 of the G/W server 12 stores the information provision response message 220 in the provision message management DB 15 (S303). As a specific example of the provision message management DB 15, a record aggregate is assumable, which includes values such as the client company ID that is the identification information on the user company A of a requester for the information provision using the case number as a key, the supplier company ID that is the identification information on the user company B of the information provider, the product information and product version that are the identification information on the target product of which information has been provided upon request of the user company A, the attached file, and provision status indicating whether or not an information provision response message has been provided to the user company A of a requester for the information provision, as shown in FIG. 19. Note that in storing the information provision response message 220 in the provision message management DB 15 in Step S303, "unprovided" is set as the value of "provision status".

On the other hand, if there is no downloaded data (S302: no downloaded data) in Step S302, the message reception function 214 of the G/W server 12 ends the processing as no target data (S304).

Procedure Example 6

Figure 8:
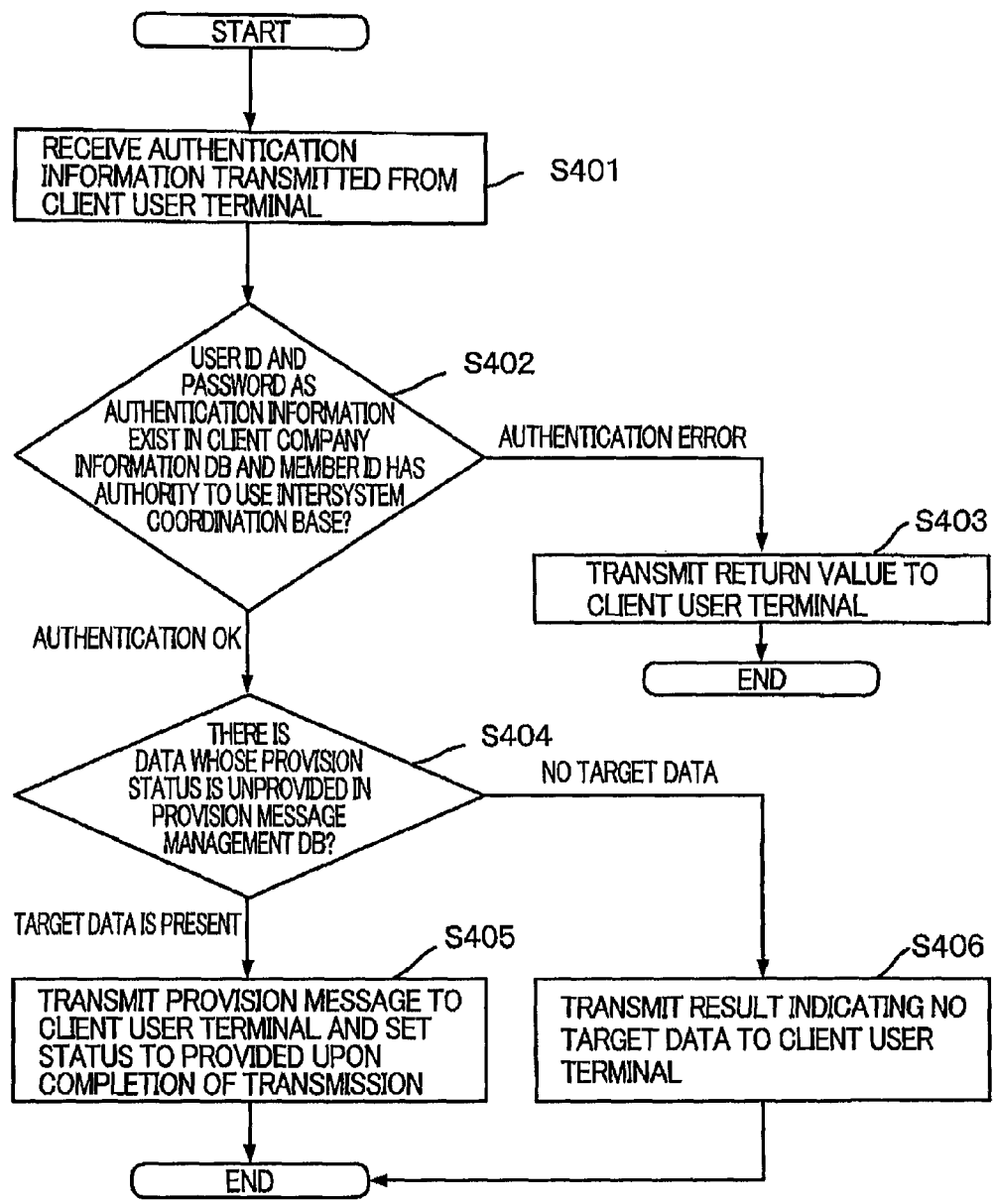
FIG. 8 is a flowchart showing procedure example 6 of the information processing method according to the present embodiment.

Next, with reference to the drawing, a description will be given of Step S4 in the aforementioned Procedure Example 1. FIG. 8 is a flowchart showing procedure example 6 of the information processing method according to the present embodiment, more specifically, a flowchart showing a procedure for the G/W server 12 to transmit the information provision response message 220 to the client user terminal 11.

In this case, the G/W server 12 receives the authentication information 218 transmitted from the client user terminal 11 (S401). A data structure example of the authentication information 218 is the same as that described in the aforementioned procedure example 3.

The authentication function 211 of the G/W server 12 checks the user ID and password as the authentication information 218 against the client company information DB 18 to confirm that the set of the user ID and the password exists in the record of the client company information DB 18 (S402). A specific example of the client company information DB 18 is the same as that described in the aforementioned procedure example 3. Moreover, in Step S402, the authentication function 211 of the G/W server 12 checks the value of the intersystem coordination base use authority in the record of the client company information DB 18 to see if the user company corresponding to the user ID has the authority to use the intersystem coordination base 2.

When the received user ID and password do not exist in the client company information DB 18 or when the user company corresponding to the user ID does not have the authority to use the intersystem coordination base 2 (S402; authentication error), the authentication function 211 of the G/W server 12 transmits a predetermined return value indicating unsuccessful authentication to the client user terminal 11, and then ends the processing (S403).

On the other hand, when the received user ID and password exist in the client company information DB 18 and the user company corresponding to the user ID has the authority to use the intersystem coordination base 2 (S402; authentication OK), the message response function 215 of the G/W server 12 checks if the records concerning the user company indicated by the authentication information 218 includes a record having "unprovided" as the value of provision status.

If there is the record having "unprovided" as the value of provision status (S404: target data is present) in Step S404, the message response function 215 of the G/W server 12 transmits the information provision response message 220 having "unprovided" as the value of provision status to the client user terminal 11 (S405). Upon completion of the transmission, the G/W server 12 updates the value of provision status in the record to "provided" in the provision message management DB 15.

On the other hand, If there is no record having "unprovided" as the value of provision status (S404: no target data) in Step S404, the message response function 215 of the G/W server 12 transmits a result of no target data to the client user terminal 11 (S406), and then ends the processing.

Procedure Example 7

Figure 9:
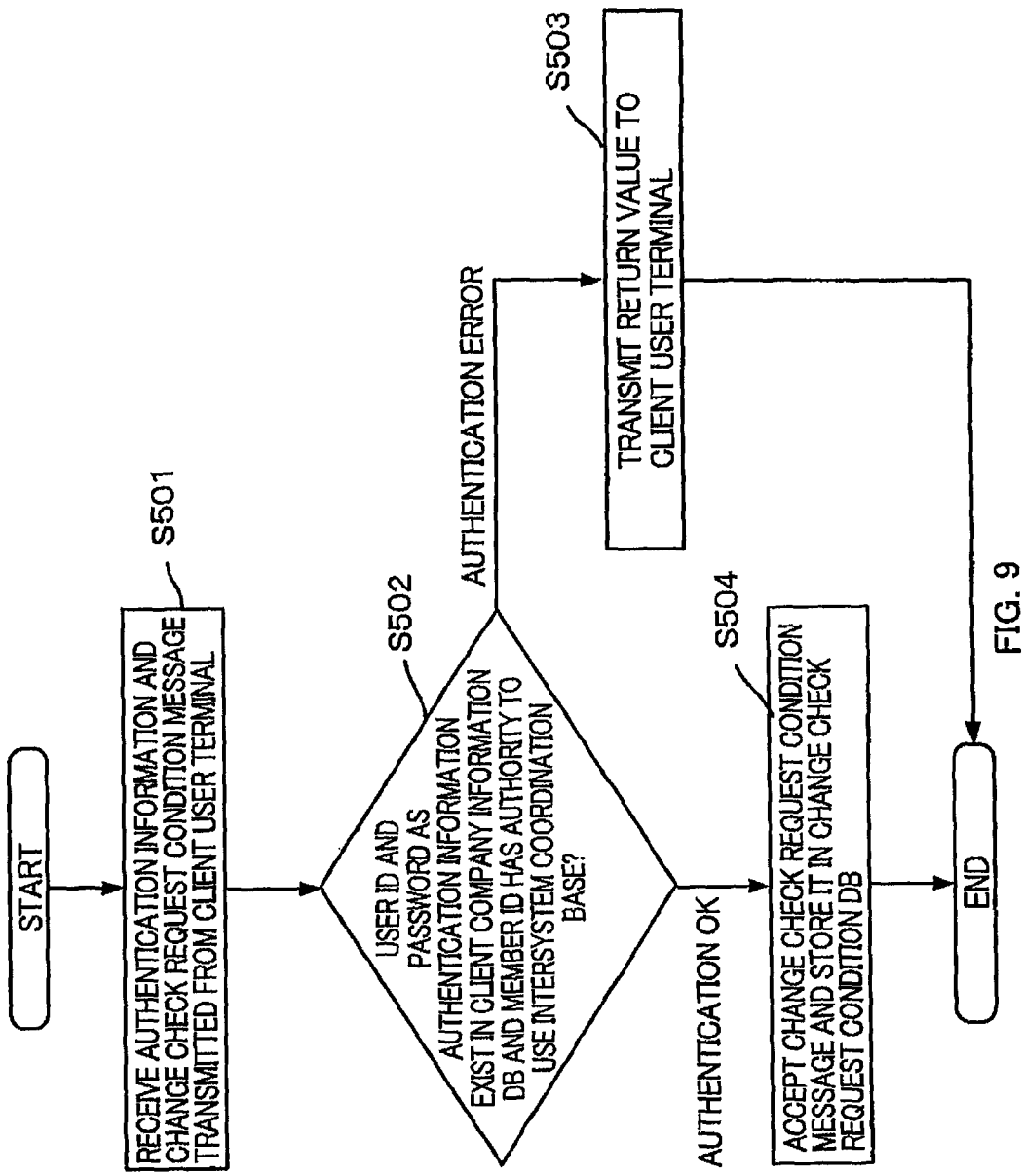
FIG. 9 is a flowchart showing procedure example 7 of the information processing method according to the present embodiment.

Next, with reference to the drawing, a description will be given of Step S5 in the aforementioned Procedure Example 2. FIG. 9 is a flowchart showing procedure example 7 of the information processing method according to the present embodiment, more specifically, a flowchart showing a procedure for the G/W server 12 to accept the change check request condition message 221 from the client user terminal 11 and to register the message in the change check request condition DB 21.

In this case, the G/W server 12 receives the authentication information 218 and the change check request condition message 221 which are transmitted from the client user terminal 11 (S501). A specific example of the change check request condition message 221 is the same as that described in the aforementioned procedure example 2. The authentication function 211 of the G/W server 12 checks the user ID and password as the authentication information 218 received from the client user terminal 11 against the client company information DB 18 to confirm that the set of the user ID and the password exists in the record of the client company information DB 18 (S502). Moreover, in Step S502, the authentication function 211 of the G/W server 12 checks the value of the intersystem coordination base use authority in the record of the client company information DB 18 to see if the user company corresponding to the user ID has the authority to use the intersystem coordination base 2.

When the received user ID and password do not exist in the client company information DB 18 or when the user company corresponding to the user ID does not have the authority to use the intersystem coordination base 2 (S502; authentication error), the authentication function 211 of the G/W server 12 transmits a predetermined return value indicating unsuccessful authentication to the client user terminal 11, and then ends the processing (S503). On the other hand, when the received user ID and password exist in the client company information DB 18 and the user company corresponding to the user ID has the authority to use the intersystem coordination base 2 (S502; authentication OK), the message acceptance function 212 of the G/W server 12 accepts the change check request condition message 221 as a changed content check request from the client user terminal 11, and then stores the message in the change check request condition DB 21 (S504).

As a specific example of the change check request condition DB 21, a record aggregate is assumable, which includes values such as the member ID that is the identification information on the user company A that is a requester of the changed content check, and check conditions 1 to 3.

Procedure Example 8

Figure 10:
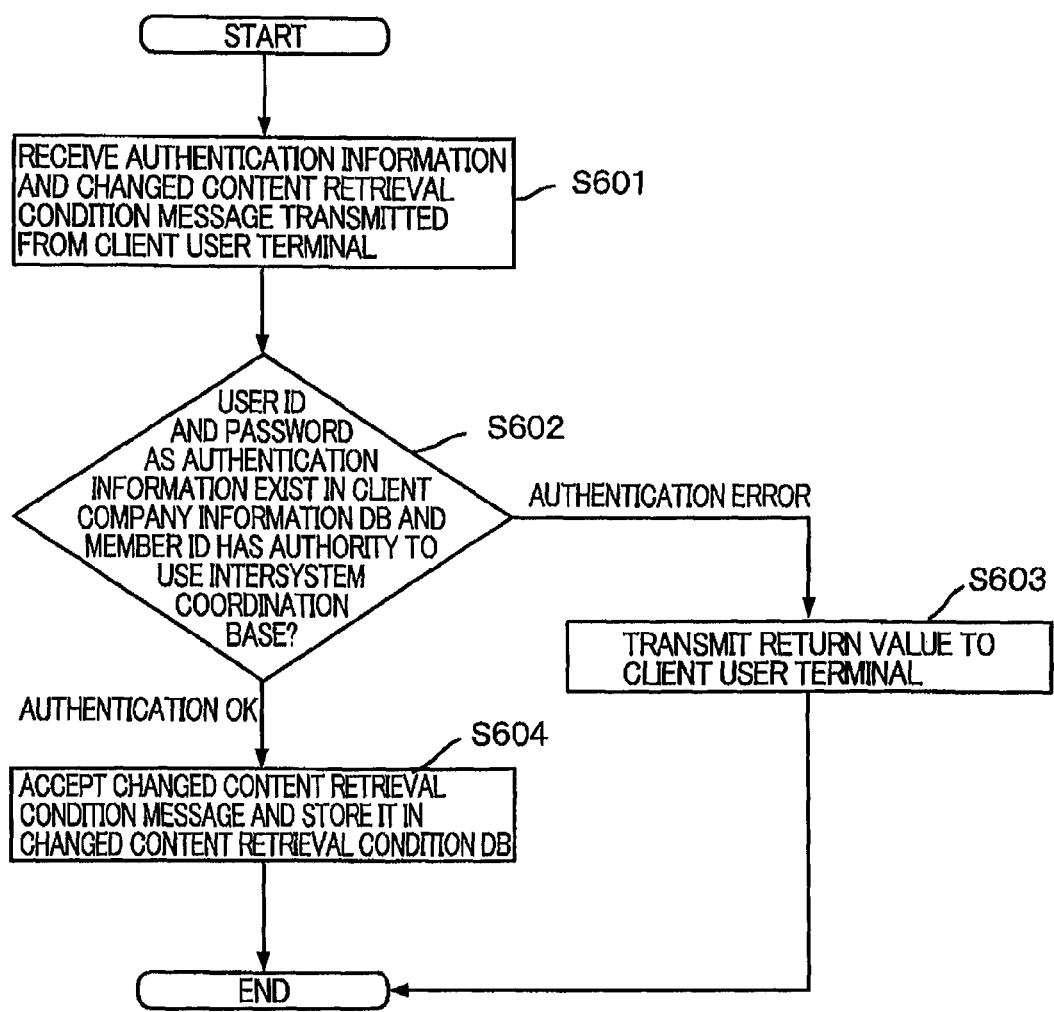
FIG. 10 is a flowchart showing procedure example 8 of the information processing method according to the present embodiment.

Next, with reference to the drawing, a description will be given of Step S6 in the aforementioned Procedure Example 2. FIG. 10 is a flowchart showing procedure example 8 of the information processing method according to the present embodiment, more specifically, a flowchart showing a procedure for the G/W server 12 to accept the changed content retrieval condition message 222 from the client user terminal 11 and to register the message in the changed content retrieval condition DB 22.

In this case, the G/W server 12 receives the authentication information 218 and the changed content retrieval condition message 222 which are transmitted from the client user terminal 11 (S601). The authentication function 211 of the G/W server 12 checks the user ID and password as the authentication information 218 against the client company information DB 18 to confirm that the set of the user ID and the password exists in the record of the client company information DB 18 (S602). Moreover, in Step S602, the authentication function 211 of the G/W server 12 checks the value of the intersystem coordination base use authority in the record of the client company information DB 18 to see if the user company corresponding to the user ID has the authority to use the intersystem coordination base 2.

When the received user ID and password do not exist in the client company information DB 18 or when the user company corresponding to the user ID does not have the authority to use the intersystem coordination base 2 (S602; authentication error), the authentication function 211 of the G/W server 12 transmits a predetermined return value indicating unsuccessful authentication to the client user terminal 11, and then ends the processing (S603). On the other hand, when the received user ID and password exist in the client company information DB 18 and the user company corresponding to the user ID has the authority to use the intersystem coordination base 2 (S602; authentication OK), the message acceptance function 212 of the G/W server 12 accepts the changed content retrieval condition message 222 from the client user terminal 11, and then stores the message in the changed content retrieval condition DB 22 (S604). As a specific example of the changed content retrieval condition DB 22, a record aggregate is assumable, which includes values such as the member ID that is the identification information on the user company A of a requester of changed content check, and retrieval condition 1 (product information) and retrieval condition 2 (product version) which specify a target changed content to be acquired by the client user terminal 11, among the changed contents on the information on the check target, as shown in FIG. 20. In the example of the changed content retrieval condition DB 22 shown in FIG. 20, for example, there is stored a condition for retrieving only a changed content matching "PARTS21" of the retrieval condition 1 (product information) and "2.0 or later" of the retrieval condition 2 (product version) among the changed contents retrievable in response to a check request of the member ID "MEMBER 1".

Procedure Example 9

Figure 11:
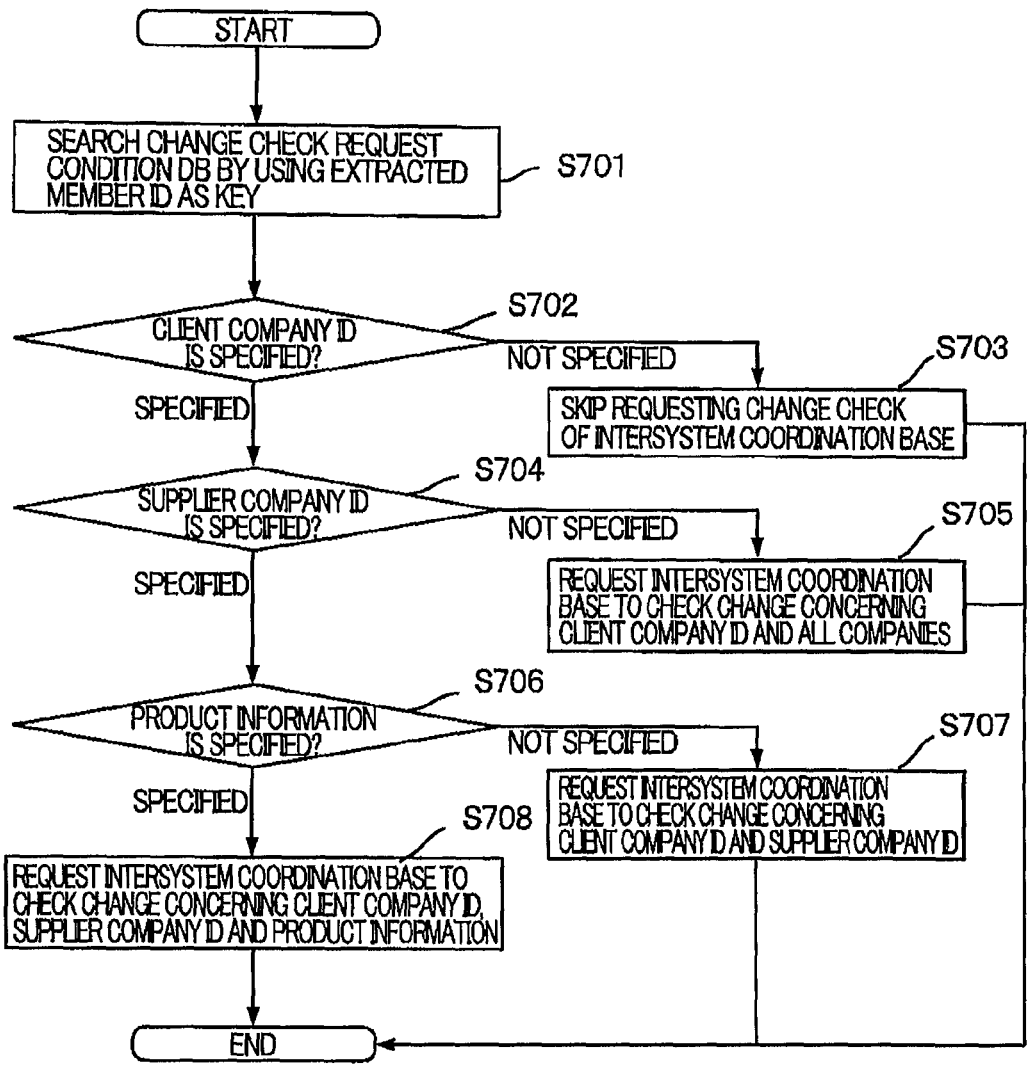
FIG. 11 is a flowchart showing procedure example 9 of the information processing method according to the present embodiment.

Next, with reference to the drawing, a description will be given of Step S7 in the aforementioned Procedure Example 2. FIG. 11 is a flowchart showing procedure example 9 of the information processing method according to the present embodiment, more specifically, a flowchart showing a procedure for the G/W server 12 to read the change check request condition in the change check request condition DB 21 and to request the intersystem coordination base 2 to check the changed contents according to the change check request condition.

In this case, the change notification control function 216 of the G/W server 12 extracts the member ID from each record of the client company information DB 18, and searches the change check request condition DB 22 by using the extracted member ID as a key (S701). The change notification control function 216 of the G/W server 12 checks if the client company ID is specified in the record retrieved by the search (S702).

When the client company ID is specified in the record (Step S702: not specified), the change notification control function 216 of the G/W server 12 does not make a change check request to the intersystem coordination base 2 (S703), and then ends the processing. Such a situation corresponds to a situation where the user does not make a request for changed content check.

On the other hand, when the client company ID is specified in the record (Step S702: specified), the change notification control function 216 of the G/W server 12 checks if the supplier company ID is specified in the record (S704). Here, when no supplier company ID is specified in the record (Step S704: not specified), the change notification control function 216 of the G/W server 12 requests the intersystem coordination base 2 to confirm all changes made regarding the client company ID checked in Step S702 (S705), and then ends the processing.

On the other hand, when the supplier company ID is specified in the record (Step S704: specified), the change notification control function 216 of the G/W server 12 checks if product information is specified in the record (S706). When no product information is specified in the record (Step S706: not specified), the change notification control function 216 of the G/W server 12 requests the intersystem coordination base 2 to perform change check using an AND condition including the client company ID checked in Step S702 and the supplier company ID checked in Step S704 (S707), and then ends the processing.

On the other hand, when the product information is specified in the record (Step S706: specified), the change notification control function 216 of the G/W server 12 requests the intersystem coordination base 2 to perform change check using an AND condition including the client company ID checked in Step S702, the supplier company ID checked in Step S704 and the product information checked in Step S706 (S708), and then ends the processing.

Procedure Example 10

Figure 12:
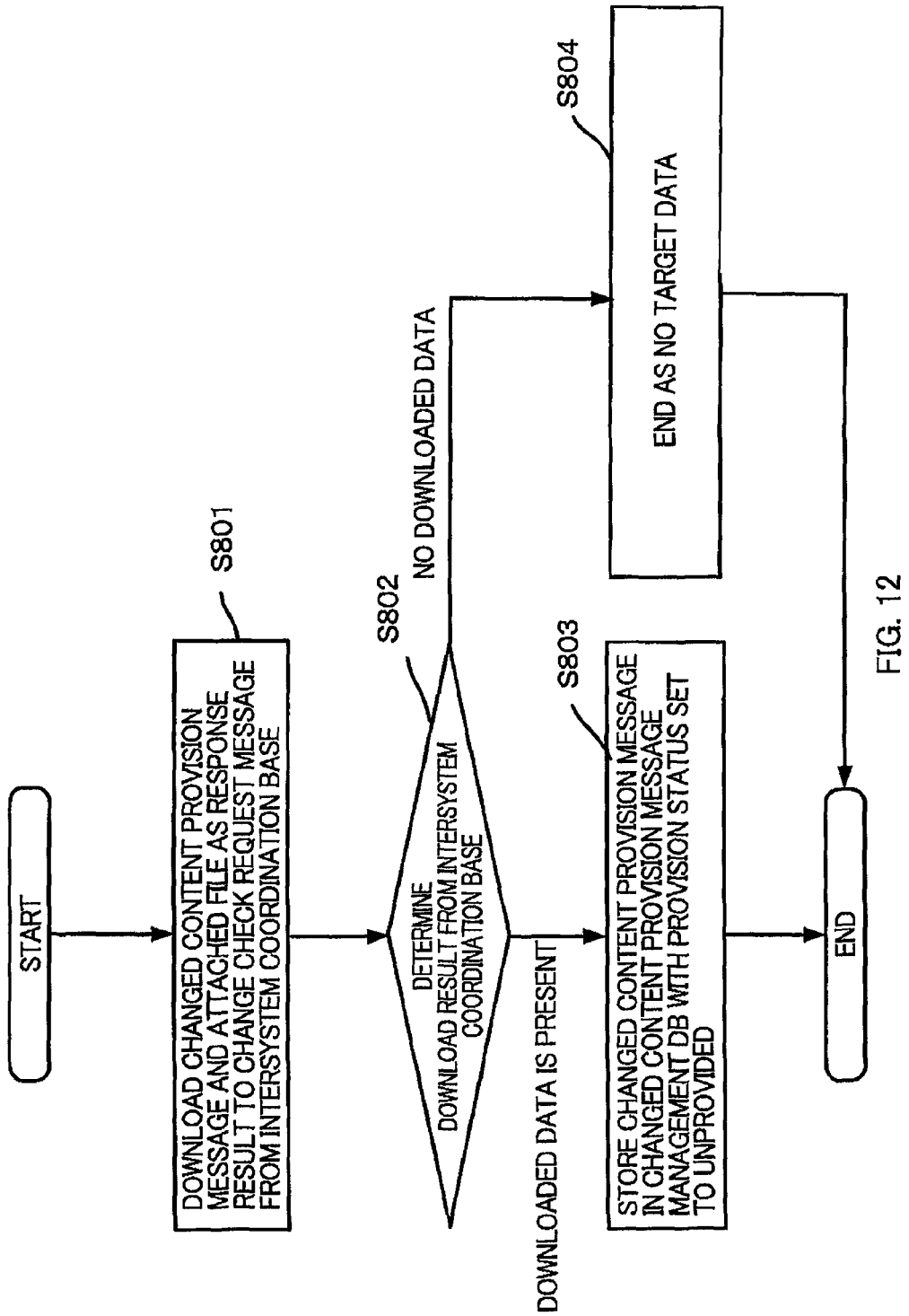
FIG. 12 is a flowchart showing procedure example 10 of the information processing method according to the present embodiment.

Next, with reference to the drawing, a description will be given of Step S8 in the aforementioned Procedure Example 2. FIG. 12 is a flowchart showing procedure example 10 of the information processing method according to the present embodiment, more specifically, a flowchart showing a procedure for the G/W server 12 to acquire a changed content of information of a check target from the intersystem coordination base 2 that has executed necessary processing in response to the changed content check request.

In this case, the G/W server 12 downloads, from the intersystem coordination base 2, the changed content provision message 224 and attached file which have been uploaded by the supplier user terminal 23 as the result of the response to the change check request message 223 (S801).

Also, the G/W server 12 determines the result of the downloading from the intersystem coordination base 2 (S802). When the downloaded data, i.e., the changed content provision message 224 and the like are acquired by the downloading (S802: downloaded data is present), the message reception function 214 of the G/W server 12 stores the downloaded changed content provision message 224 in the changed content provision message management DB 17 (S803), and then ends the processing. Note that the message reception function 214 of the G/W server 12 sets "unprovided" as the value of the changed content provision status in storing the downloaded changed content provision message 224 in the changed content provision message management DB 17.

As a specific example of the changed content provision message management DB 17, a record aggregate is assumable, which includes values such as the client company ID that is the identification information on the user company A of the requester of the information provision using the case number as a key, the supplier company ID that is the identification information on the user company B of the provider of the information, the product information and product version that are the identification information on the target product of which information has been provided upon request of the user company A, the attached file, and the changed content provision status indicating whether or not the changed content has been provided to the user company A of the requester of the information provision, as shown in FIG. 23.

On the other hand, when the downloaded data, i.e., the changed content provision message 224 and the like are not acquired by the downloading (S802: no downloaded data), the message reception function 214 of the G/W server 12 ends the processing as no target data (S804).

Procedure Example 11

Figure 13:
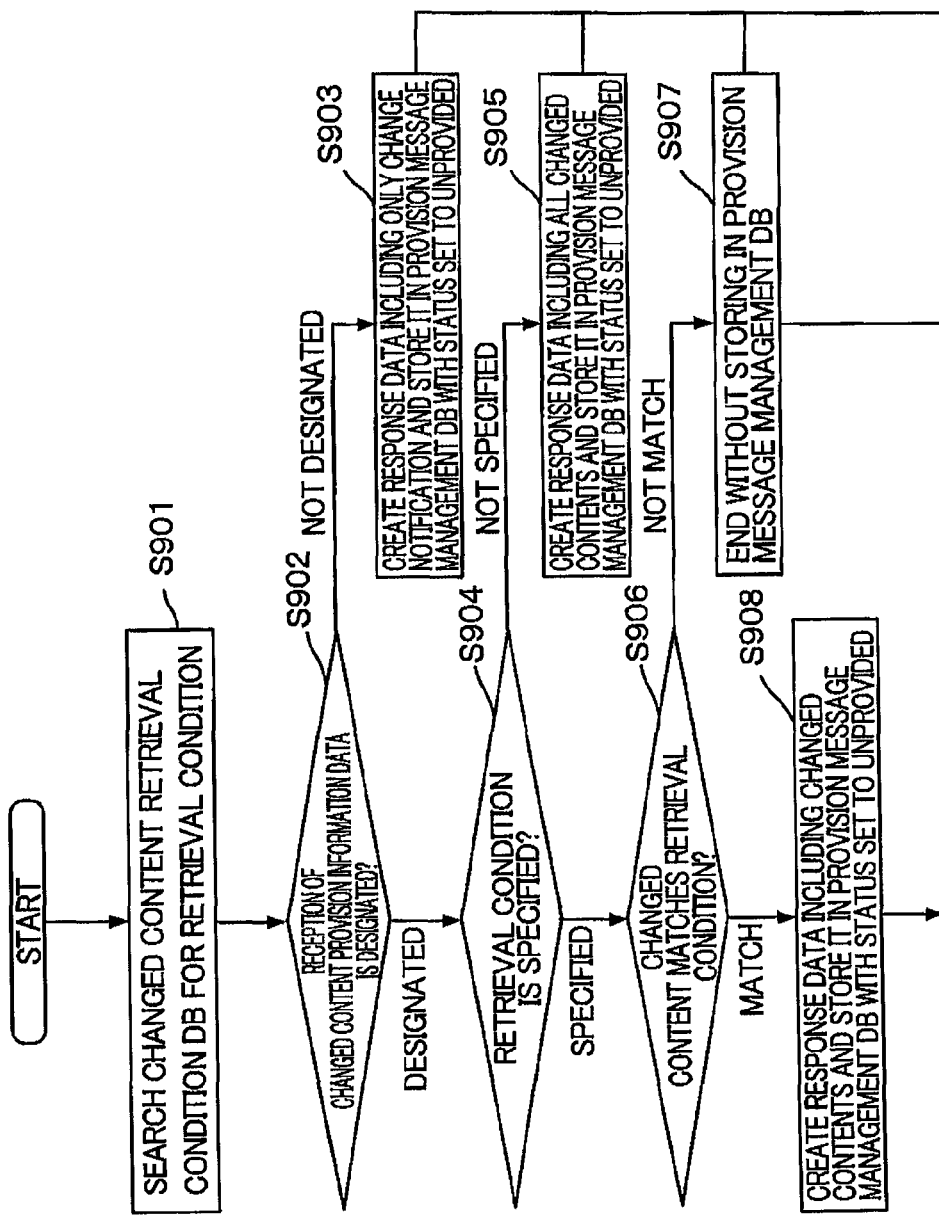
FIG. 13 is a flowchart showing procedure example 11 of the information processing method according to the present embodiment.

Next, with reference to the drawing, a description will be given of Step S9 in the aforementioned Procedure Example 2. FIG. 13 is a flowchart showing procedure example 11 of the information processing method according to the present embodiment, more specifically, a flowchart showing a procedure for the G/W server 12 to read retrieval conditions from the changed content retrieval condition DB 22, finds changed content information that matches the retrieval conditions, and generate the changed content provision message 224 including the found information for the client user terminal 11.

In this case, the change notification control function 216 of the G/W server 12 searches the changed content retrieval condition DB 22 to retrieve a record for a member ID of a certain user company (S901). The change notification control function 216 of the G/W server 12 also determines whether or not any record is retrieved for the member ID by the search (S902).

If no record is retrieved by the search (S902: not designated), the change notification control function 216 of the G/W server 12 determines that the user company is not designated as a company needing to receive the changed content provision message 224 as the result of the changed content check request, creates the changed content provision message 224 including only change notification, and then stores the created message in the provision message management DB 15 (S903). Note that the change notification control function 216 of the G/W server 12 sets the provision status to "unprovided" in storing the changed content provision message 224 in the provision message management DB 15.

On the other hand, if the record concerning the member ID is retrieved by the search (S902: designated), the change notification control function 216 of the G/W server 12 determines whether or not retrieval conditions are specified for the record retrieved in Step S901 (S904). When it is determined that no retrieval conditions are specified for the record (S904: not specified), the change notification control function 216 of the G/W server 12 sets all the changed contents retrieved for the member ID as the changed content provision message 224, and stores the message in the provision message management DB 15 (S905). Note that the change notification control function 216 of the G/W server 12 sets "unprovided" as the value of provision status in the record in storing the changed content provision message 224 in the provision message management DB 15.

When it is determined that retrieval conditions are specified for the record (S904: specified), the change notification control function 216 of the G/W server 12 checks the changed content retrieved for the member ID in Step S8 against the retrieval conditions specified in Step S904 (S906). When the changed content retrieved for the member ID does not match the retrieval conditions as a result of the checking (S906: not match), the change notification control function 216 of the G/W server 12 ends the processing without storing the changed content in the provision message management DB 15 (S907).

On the other hand, when the changed content retrieved for the member ID matches the retrieval conditions (S906: match), the change notification control function 216 of the G/W server 12 sets the changed content that matches the retrieval conditions as the changed content provision message 224, and stores the message in the provision message management DB 15 (S908). Note that the change notification control function 216 of the G/W server 12 sets "unprovided" as the value of provision status in the record in storing the changed content provision message 224 in the provision message management DB 15.

Procedure Example 12

Figure 14:
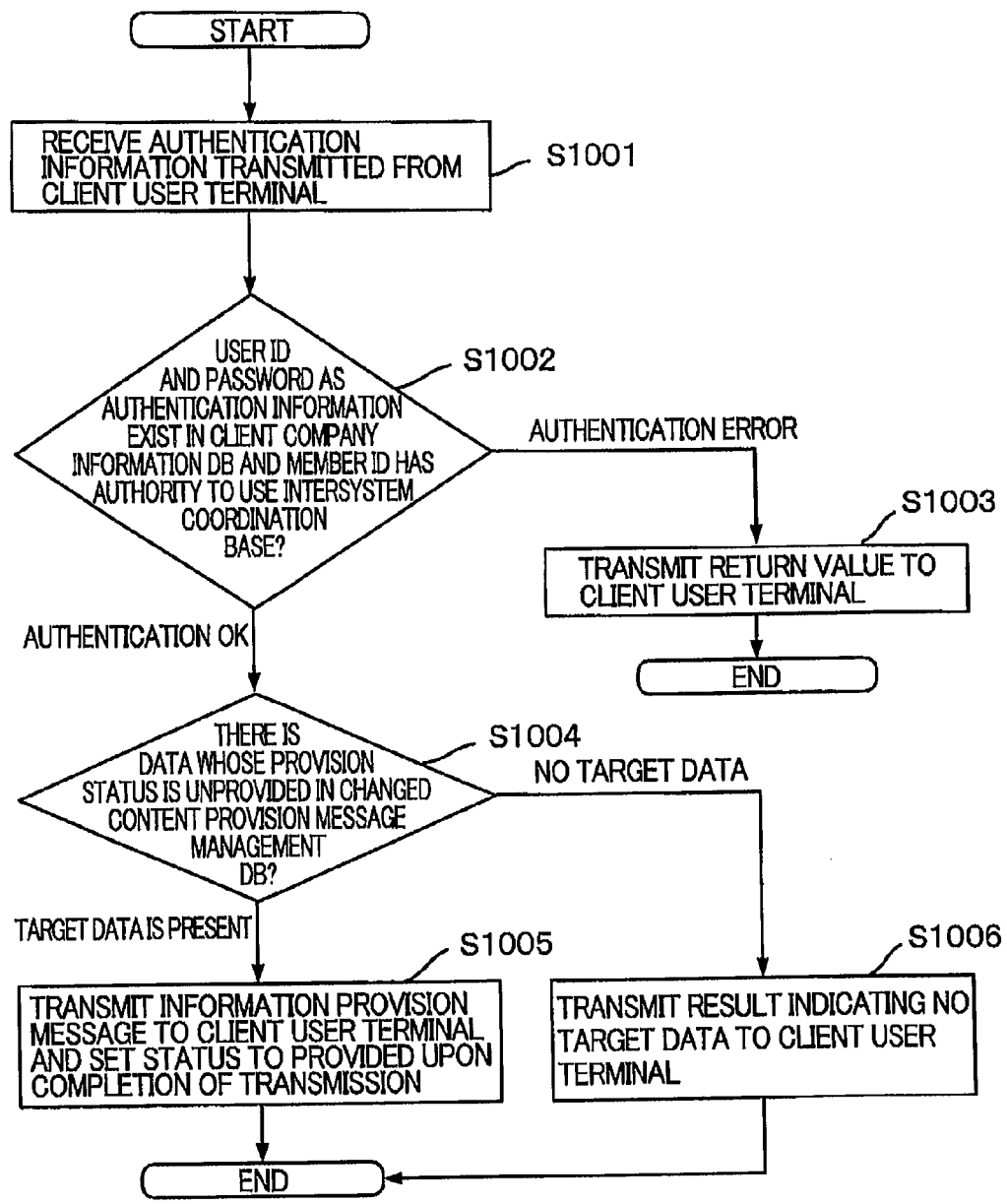
FIG. 14 is a flowchart showing procedure example 12 of the information processing method according to the present embodiment.

Next, with reference to the drawing, a description will be given of Step S10 in the aforementioned Procedure Example 2. FIG. 14 is a flowchart showing procedure example 12 of the information processing method according to the present embodiment, more specifically, a flowchart showing a procedure for the G/W server 12 to transmit the changed content provision message 224 to the client user terminal 11.

In this case, the G/W server 12 receives the authentication information 218 transmitted from the client user terminal 11 (S1001). The authentication function 211 of the G/W server 12 checks the user ID and password as the authentication information 218 against the client company information DB 18 to confirm that the set of the user ID and the password exists in the record of the client company information DB 18 (S1002). Moreover, in Step S602, the authentication function 211 of the G/W server 12 checks the value of the intersystem coordination base use authority in the record of the client company information DB 18 to see if the user company corresponding to the user ID has the authority to use the intersystem coordination base 2.

When the received user ID and password do not exist in the client company information DB 18 or when the user company corresponding to the user ID does not have the authority to use the intersystem coordination base 2 (S1002; authentication error), the authentication function 211 of the G/W server 12 transmits a predetermined return value indicating unsuccessful authentication to the client user terminal 11, and then ends the processing (S1003). On the other hand, when the received user ID and password exist in the client company information DB 18 and the user company corresponding to the user ID has the authority to use the intersystem coordination base 2 (S1002; authentication OK), the message response function 215 of the G/W server 12 searches the records in the provision message management DB 15 for a record having the provision status "unprovided" (S1004). If there is the record having the provision status "unprovided" (S1004: target data is present), the message response function 215 of the G/W server 12 transmits the changed content provision message 224 indicated by the record to the client user terminal 11 (S1005), and ends the processing. Note that, upon completion of the transmission, the message response function 215 of the G/W server 12 sets the value of provision status in the record in the provision message management DB 15 to "provided".

On the other hand, if there is no record having the provision status "unprovided" (S1004: no target data) in Step S1004, the message response function 215 of the G/W server 12 transmits a result of no target data to the client user terminal 11 (S1006), and then ends the processing.

While the embodiment of the present invention has been specifically described above, the present invention is not limited thereto. Various modifications can be applied to the embodiment without departing from the spirit and scope of the invention.

According to the present embodiment, check of information change between different systems is performed by providing an information requesting user with a notification of information change of an information change check target in a manner meeting the needs of the information requesting user, thereby lightening the workloads, efforts and the like of users.

The description of the present specification clarifies at least the following. Specifically, in the information processor of the present embodiment, the computing device may acquire, as the first or second condition, at least any of identification information on the user of the different system, identification information on a product handled by the user of the different system and a combination thereof, and store the acquired information in the storage device.

In addition, in the information processor of the present embodiment, the computing device may acquire, as the first or second condition, specification information on a product handled by the user of the different system, and store the acquired information in the storage device.

Moreover, in the information processor of the present embodiment, the computing device may acquire, as the first or second condition, a combination of identification information on the user of the different system and identification information on the user of the user terminal who has transmitted the check request or the second condition, and store the acquired information in the storage device.

Furthermore, the information processor of the present embodiment may be a server apparatus configured to intermediate between a product supplier and a buyer for inter-company transactions, and may exchange data with another inter-company transaction system that is a different system through the converter.

What is claimed is:

1. An information processing system comprising:
 a communication device configured to communicate with a first terminal and a converter;
 a storage device configured to store data and instructions; and
 a computing device configured to read the instructions and execute:
   receiving a changed content check request on information managed by a second terminal of a different system from the first terminal and storing a first condition in the storage device, the first condition being included in the check request and specifying a check target in the information managed by the second terminal, receiving a second condition from the first terminal, the second condition specifying a changed content to be retrieved from among changed contents of the check target in the information managed by the different system, and storing the second condition in the storage device, the second condition being different from the first condition, transmitting an information-changed content check request, in which the first condition is specified, to the converter which is configured to perform protocol conversion between the information processing system and the different system, acquiring a changed content check result from the converter, and storing the acquired changed content check result in the storage device, the changed content check result being returned to the converter in response to the check request by the second terminal of the different system which has accessed the converter and performed a changed content check according to the first condition on the information managed by the different system, and checking the changed content check result stored in the storage device against the second condition, and returning only changed content from the changed content check result that matches the second condition to the first terminal.

2. The information processing system according to claim 1, wherein
the computing device acquires, according to the first or second condition, at least one of identification information of the different system, identification information on a product in the information managed by the second terminal of the different system and a combination thereof, and stores the acquired information in the storage device.

3. The information processing system according to claim 1, wherein
the computing device acquires, as the first or second condition, specification information on a product handled by the user of the different system, and stores the acquired information in the storage device.

4. The information processing system according to claim 1, wherein
the computing device acquires, according to the first or second condition, a combination of identification information of the different system and identification information of the first terminal, and stores the acquired information in the storage device.

5. The information processing system according to claim 1, wherein
the information processing system is a server apparatus configured to intermediate between a product supplier as the different system and a buyer for inter-company transactions as the first terminal, and exchanges data with the different system through the converter.

6. An information processing method for an information processing system including a communication device configured to communicate with a first terminal through a network and a storage device configured to store data, the method comprising:

receiving a changed content check request on information managed by a second terminal of a different system from the first terminal and storing a first condition in the storage device, the first condition being included in the check request and specifying a check target in the information managed by the second terminal;

receiving a second condition from the first terminal, the second condition specifying a changed content to be retrieved from among changed contents of the check target in the information managed by the different system, and storing the second condition in the storage device, the second condition being different from the first condition;

transmitting an information-changed content check request in which the first condition is specified, to a converter configured to perform protocol conversion between the information processing system and the different system;

acquiring a changed content check result from the converter, and storing the acquired changed content check result in the storage device, the changed content check result being returned to the converter in response to the check request by the second terminal of the different system which has accessed the converter and performed a changed content check according to the first condition on the information managed by the different system; and checking the changed content check result stored in the storage device against the second condition, and returning only changed content from the changed content check result that matches the second condition to the first terminal.

* * * * *